(12) United States Patent
Rink et al.

(10) Patent No.: US 6,818,082 B2
(45) Date of Patent: Nov. 16, 2004

(54) AIRBAG INFLATION GAS GENERATION

(75) Inventors: Karl K. Rink, Liberty, UT (US); David J. Green, Brigham City, UT (US); Ivan V. Mendenhall, Providence, UT (US)

(73) Assignee: Autoliv ASP, Inc., Ogden, UT (US)

( * ) Notice: Subject to any disclaimer, the term of this patent is extended or adjusted under 35 U.S.C. 154(b) by 202 days.

(21) Appl. No.: 09/836,514

(22) Filed: Apr. 17, 2001

(65) Prior Publication Data

US 2002/0148543 A1 Oct. 17, 2002

(51) Int. Cl.$^7$ ............................................... C06B 43/00
(52) U.S. Cl. ................................................... 149/109.4
(58) Field of Search .................................. 149/46, 109.4

(56) References Cited

U.S. PATENT DOCUMENTS

| | | |
|---|---|---|
| 2,904,420 A | 9/1959 | Holker |
| 3,901,747 A | 8/1975 | Garner |
| 4,280,409 A * | 7/1981 | Rozner et al. ............... 102/364 |
| 5,348,344 A | 9/1994 | Blumenthal et al. |
| 5,486,248 A * | 1/1996 | Taylor et al. ............. 149/109.6 |
| 5,669,629 A | 9/1997 | Rink |
| 5,803,492 A | 9/1998 | Rink et al. |
| 5,847,315 A | 12/1998 | Katzakian, Jr. et al. |
| 5,884,938 A | 3/1999 | Rink et al. |
| 5,941,562 A | 8/1999 | Rink et al. |
| 6,224,099 B1 * | 5/2001 | Nielson et al. ............... 280/741 |

FOREIGN PATENT DOCUMENTS

| | | |
|---|---|---|
| DE | 195 31 288 A 1 | 2/1997 |
| EP | 0 972 757 A1 | 1/2000 |
| WO | WO 97/23367 | 7/1997 |
| WO | WO 99/15377 | 4/1999 |
| WO | 99/28166 | 6/1999 |
| WO | WO 00/02749 | 1/2000 |
| WO | 00/29261 | 5/2000 |

* cited by examiner

*Primary Examiner*—John R. Hardee
(74) *Attorney, Agent, or Firm*—Sally J. Brown

(57) ABSTRACT

Methods and apparatuses for gas generation via a water-supplying compound and a water-reactive fuel precursor.

16 Claims, 10 Drawing Sheets

AIRBAG INFLATION GAS GENERATION

BACKGROUND OF THE INVENTION

This invention relates generally to gas generation and, more particularly, to devices and methods for inflating an inflatable device such as an inflatable vehicle occupant restraint of a respective inflatable restraint system.

It is well known to protect a vehicle occupant using a cushion or bag, e.g., an "airbag cushion," that is inflated or expanded with gas such as when the vehicle encounters sudden deceleration, such as in the event of a collision. In such systems, the airbag cushion is normally housed in an uninflated and folded condition to minimize space requirements. Upon actuation of the system, the cushion begins to be inflated, in a matter of no more than a few milliseconds, with gas produced or supplied by a device commonly referred to as an "inflator."

Many types of inflator devices have been disclosed in the art for the inflating of one or more inflatable restraint system airbag cushions. Prior art inflator devices include compressed stored gas inflators, pyrotechnic inflators and hybrid inflators. Unfortunately, each of these types of inflator devices has been subject to certain disadvantages such as one or more of having a greater than desired weight, requiring more than desired space or volume, producing undesired or nonpreferred combustion products in greater than desired amounts, and producing or emitting gases at a greater than desired temperature, for example. Further, in those inflator devices that rely upon the reaction of a gas generant material or fuel to produce or provide inflation gas, the cost of producing or supplying such gas generant material or fuel and associated inflator device may be greater than would otherwise be desired.

Various relatively low cost materials are available which when contacted with water will liberate heat and form hydrogen-containing products, e.g., hydrogen and/or one or more various hydrocarbons. For example, hydrogen can rapidly be produced as one primary reaction product when a metal hydride, such as lithium hydride, is contacted with water.

Unfortunately, the greater or more extensive use of water-reactive materials in inflator technology has generally been limited as a result of various safety and manufacturing concerns. As will be appreciated, the reactivity of these materials when in contact with water has generally necessitated that such water-reactive materials be kept dry or free of contact with water during both the manufacturing process and while in the inflator in a static or nonactivated state. In practice this has generally necessitated that water-reactive materials be stored or held separately from contact with water, including the water charge such as needed for subsequent reaction upon actuation, both during manufacture and while in a subject inflator device in a static state or condition. As a result, the manufacturing and design costs associated with these materials, their use and corresponding or associated inflator devices that use or incorporate these materials have traditionally been relatively high and thus the use of such water-reactive materials has not been generally successfully pursued as a viable option as compared to inflator device use of pyrotechnic gas generant materials and the like, for example.

Thus, there remains a need and a demand for a gas generating device, an apparatus for inflating an inflatable device and a method for inflation that each more freely permits the use of lower cost reactant materials such as when contacted with water will liberate heat and form hydrogen-containing products, e.g., hydrogen and/or one or more various hydrocarbons, as described above. In particular, there exists a need and demand for an inflator device and inflation method that may desirably facilitate or otherwise more easily permit the advantageous use of such water-reactive compounds while avoiding or minimizing one or more of the shortcomings or limitations relating to the prior use of water-reactive compounds in such inflation applications.

There has been and continues to be significant interest in gas generant compositions incorporation and use of ammonium nitrate. In particular, ammonium nitrate is a relatively low cost, readily available and generally high gas yield component material for inclusion in such compositions.

Unfortunately, the general incorporation and use of ammonium nitrate in pyrotechnic gas generant formulations have generally been subject to certain difficulties. For example, ammonium nitrate-containing pyrotechnic gas generant formulations have commonly been subject to phase or other changes in crystalline structure such as may be associated with volumetric expansion such as may occur during temperature cycling over the normally expected or anticipated range of storage conditions, e.g., temperatures of about −40° C. to about 110° C. Such changes of form or structure may result in physical degradation of such gas generant formulation forms such as when such a gas generant formulation has been shaped or formed into tablets, wafers or other selected shape or form. Further, such changes, even when relatively minute, can strongly influence the physical properties of a corresponding gas generant material and, in turn, strongly affect the burn rate of the generant material. Unless checked, such changes in ammonium nitrate structure may result in such performance variations in the gas generant materials incorporating such ammonium nitrate as to render such gas generant materials unacceptable for typical inflatable restraint system applications.

In view of the above, there is a need and a demand for a gas generating device, an apparatus for inflating an inflatable device and a method for inflation that enhance the likelihood of greater or more widespread use of reactant materials such as ammonium nitrate.

SUMMARY OF THE INVENTION

A general object of the invention is to provide an improved gas generation or inflation device and method for inflating an inflatable safety device.

A more specific objective of the invention is to overcome one or more of the problems described above.

The general object of the invention can be attained, at least in part, through an improved gas generating device wherein a fuel material reacts to form gas generation reaction products. In accordance with one preferred embodiment of the invention, such a gas generating device includes a first chamber having contents including a quantity of a water-supplying compound and a quantity of a fuel precursor. The gas generating device also includes an initiator in discharge communication with at least a portion of the quantity of water-supplying compound content of the first chamber to form water. At least a portion of the formed water reacts with at least a portion of the quantity of fuel precursor to form a quantity of the fuel material and resulting in opening of the first chamber with a release of at least a portion of the fuel material therefrom.

The prior art has generally failed to provide an inflator device and inflation method that may desirably facilitate or otherwise more easily permit the advantageous use of compounds that react with water such as to form one or more hydrogen-containing materials such as hydrogen gas or a hydrocarbon while avoiding or minimizing one or more of the shortcomings or limitations relating to the prior use of water-reactive compounds in such inflation applications. The prior art also has generally failed to provide an inflator device and inflation method that may desirably facilitate or otherwise more easily permit the advantageous use of compounds such as ammonium nitrate without incurring undesired complications such as described above relating to form and structure on the ammonium nitrate and the resulting performance characteristics thereof.

The invention further comprehends, in accordance with another embodiment of the invention, an apparatus for inflating an inflatable device. The apparatus includes a closed first chamber having contents including a quantity of ammonium nitrate and a quantity of a fuel precursor, the fuel precursor being water reactive. The apparatus also includes an initiator in discharge communication with the contents of the first chamber for initiating decomposition of at least a portion of the quantity of ammonium nitrate to form water. Upon such initiation, at least a portion of the formed water reacts with at least a portion of the quantity of the fuel precursor to form a fuel material. The first chamber is adapted to open when a predetermined increase in pressure within the first chamber is realized whereby at least a portion of the fuel material is emitted from the first chamber.

The apparatus further includes a second chamber containing a quantity of pressurized stored gas including a quantity of oxidant material. The second chamber is in fluid communication with the first chamber upon the opening of the first chamber with at least a portion of the fuel material emitted from the first chamber reacting with at least a portion of the oxidant material to form inflation gas. The second chamber is adapted to open when a predetermined increase in pressure within the second chamber is realized whereby at least a portion of the product gas is emitted from the second chamber to inflate the inflatable device.

In accordance with yet another embodiment of the invention, an improvement in a vehicular inflatable safety assembly wherein a fuel material reacts to form gas generation reaction products. More specifically, the improvement relates to the assembly containing a quantity of a water-supplying compound and a quantity of a water-reactive fuel precursor effective upon initiation to form the fuel material in situ.

The invention also comprehends a method for inflating an inflatable safety device in a vehicle. In accordance with one embodiment of the invention, such method includes heating a mixture containing at least a water-supplying compound and a water-reactive fuel precursor to form a fuel material. The formed fuel material is subsequently contacted with a quantity of compressed gas, the compressed gas including a quantity of oxidant. At least a portion of the formed fuel material reacts with at least a portion of the quantity of the oxidant to produce heat. At least a portion of the produced heat is used to heat a stored quantity of inert gas to increase the volume of the inert gas with at least a portion of the increased volume of gas passed into the inflatable safety device to effect the inflation thereof.

The invention still further comprehends an improved method for inflating an inflatable safety device in a vehicle wherein a fuel material reacts to form gas generation reaction products. The improvement involves heating a mixture containing at least ammonium nitrate and a water-reactive fuel precursor to form the fuel material.

Other objects and advantages will be apparent to those skilled in the art from the following detailed description taken in conjunction with the appended claims and drawings.

DETAILED DESCRIPTION OF THE INVENTION

Figure 1:
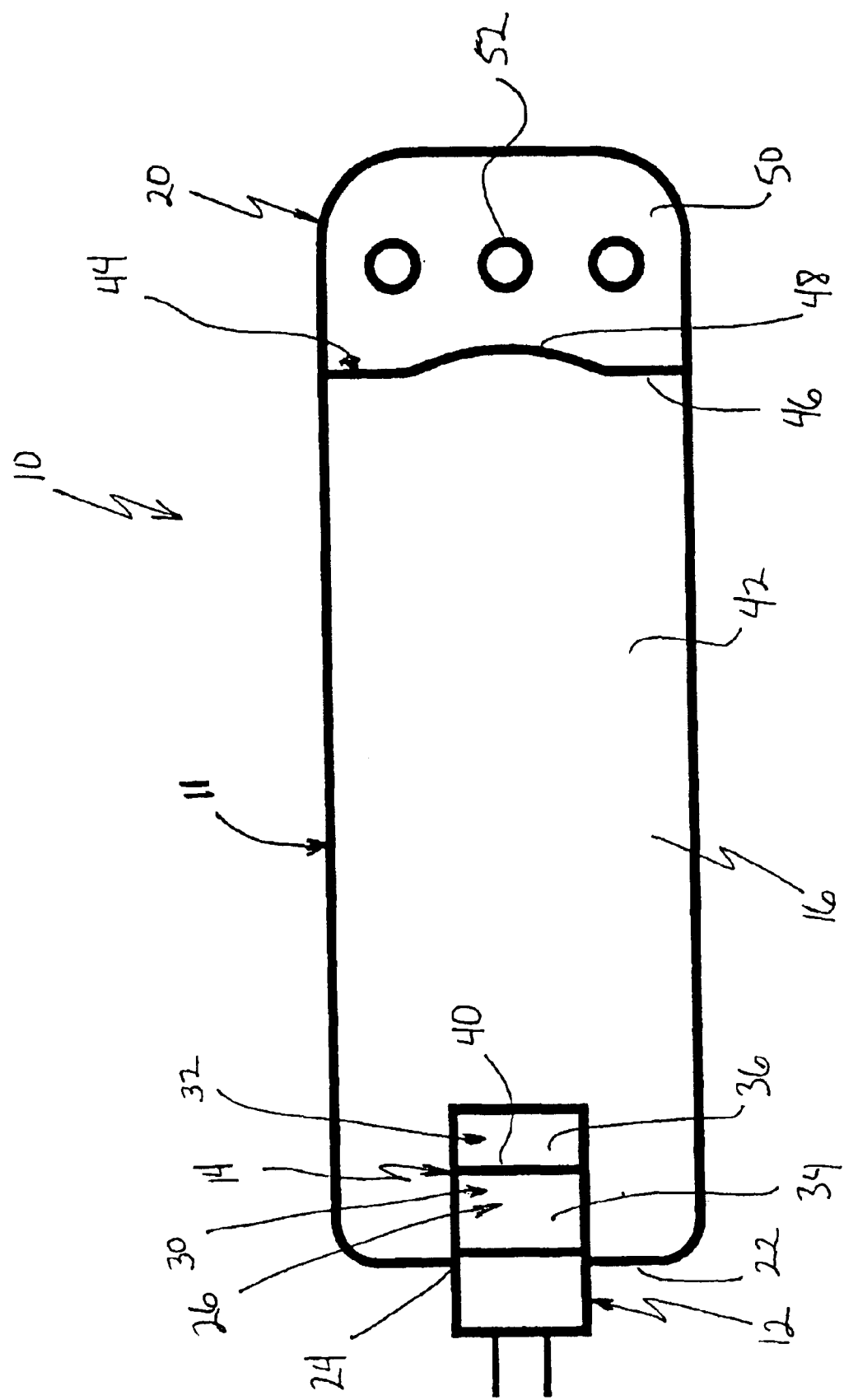
FIG. 1 is a simplified, partially in section, schematic drawing of a vehicle occupant safety assembly in accordance with one preferred embodiment of the invention.

The present invention may be embodied in a variety of different structures. As representative, FIG. 1 illustrates the present invention as embodied in a gas generating device, generally designated by the reference numeral 10. While such gas generating devices may find various uses, the invention is believed to have particular utility for generating gas such as may be used in the inflation of an inflatable vehicle occupant restraint, e.g., an inflatable airbag cushion, not shown. As identified above, such gas generating devices are commonly referred to as inflator.

As will be described in greater detail below, inflator assemblies in accordance with the invention desirably generate inflation gas via the in situ formation and subsequent reaction of a fuel material therein. Further, while the invention is described hereinafter with particular reference to an inflator for an airbag assembly such as for use in various automotive vehicles including vans, pick-up trucks, and particularly automobiles, it is to be understood that the invention also has applicability not only with various types or kinds of airbag module assemblies for automotive vehicles including driver side, passenger side, side impact, curtain and carpet airbag assemblies, for example, but also with other types of vehicles including, for example, airplanes, as well as possibly other inflation applications.

Returning to FIG. 1, the inflator 10 is an assembly that comprises a pressure vessel 11. The inflator assembly 10 includes an initiator device 12, a first chamber 14, a second chamber 16, and a diffuser assembly 20. The inflator 10 also includes a first end wall 22 that has an opening 24 therein. In the inflator assembly 10, the initiator device 12 is desirably attached through the opening 24 in sealing relation, such as via a weld, crimp or other suitable hermetic seal.

In such an assembly, the initiator device can include any suitable type of initiator means including: bridgewire, spark-discharge, heated or exploding wire or foil, through bulkhead (e.g., an initiator that discharges through a bulkhead such as in the form of a metal hermetic seal), for example, and may, if desired, optionally contain a desired load of a pyrotechnic charge. As will be appreciated, in certain preferred embodiments of the invention, the exclusion or minimization of such pyrotechnic material may be desired or required in certain application such as so minimize or avoid particulate formation or introduction into the inflation fluid of the inflator device. As will be described in greater detail below, the inclusion or presence of such pyrotechnic material may, however, be desired in certain alternative preferred embodiments of the invention such as to more easily or readily provide a large heat input for associated reaction processing. In view thereof, as pyrotechnic charge-containing initiators can typically more easily produce such relatively large heat inputs from a relatively small sized initiator device, the practice of the invention with such initiators can be particularly advantageous. An initiator may provide such a large heat input through the inclusion therewith or therein of an additional quantity of pyrotechnic, i.e., a "booster charge," such as boron potassium nitrate ($BKNO_3$), for example.

The first chamber 14 is situated adjacent the initiator device 12 in discharge communication therewith. In the illustrated static or at rest condition or state, the first chamber 14 is closed and has contents, designated by the reference numeral 26. The first chamber contents 26 include, in accordance with a preferred embodiment of the invention and as described in greater detail below, a quantity of a water-supplying compound and a quantity of a fuel precursor, which fuel precursor is water reactive.

The first chamber 14 is composed of first and second volumes 30 and 32, respectively, wherein the first chamber contents 26 are appropriately stored or contained. In the illustrated embodiment, the first volume 30 has contents 34 which include a quantity of water-reactive fuel precursor and the second volume 32 has contents 36 which include a quantity of a water-supplying compound, as described in greater detail below. In accordance with one embodiment of the invention, the first volume contents 34 include a quantity of water-reactive fuel precursor and the second volume contents 36 include a quantity of a water-supplying compound, as described in greater detail below. Alternatively, the first volume contents 34 may include a quantity of the water-supplying compound and the second volume contents 36 include a quantity of the water-reactive fuel precursor.

Further, while FIG. 1 shows the first volume 30 as being adjacent the initiator device 12, with the second volume 32 spaced away and separated from the initiator device 12 by the first volume 30, it will be understood that the broader practice of the invention is not necessarily so limited. For example, if desired, a side-by-side placement of such first and second volumes can be employed such that each of the volumes includes a portion adjacent the initiator device.

In the static state or condition, the first volume contents 34 are kept separated or segregated from the second volume contents 36 by means of a wall or barrier 40, as described in greater detail below. In practice and as will be apparent to those skilled in the art and guided by the teachings herein provided, the wall or barrier 40 can be variously constructed such as of a thin metal, such as stainless steel, for example. As will be appreciated, such separate storage or containment of the water-reactive fuel precursor and the water-supplying compound can be helpful or desired in avoiding undesired or premature reaction of reactants within the inflator such as may result in undesirable inflator performance with the passing of time.

In the illustrated static or at rest condition for the inflator 10, the second chamber 16 is closed and has contents, designated by the reference numeral 42, therein contained. The second chamber contents 42 desirably include a quantity of pressurized stored gas including a supply of oxidant material such as may appropriately react with a fuel material to form or produce a supply of gaseous products such as may be used in the inflation of an associated inflatable airbag cushion.

As will be appreciated by those skilled in the art and guided by the teachings herein provided, the second chamber contents 42 may desirably be composed a single oxidant material or a combination or mixture of two or more oxidant materials.

In accordance with certain preferred embodiments of the invention, the second chamber contents 42 may desirably be alternatively composed of a single oxidant material or a combination or mixture of two or more oxidant materials. Suitable oxidant materials, such as may be used alone or in combination, include oxygen and nitrous oxide, for example. Further, the second chamber contents 42 may, if desired, additionally contain or include one or more inert materials such as argon or helium, for example. The second chamber contents 42, in accordance with one preferred embodiment of the invention, consist essentially of an at least partially gaseous mixture of nitrous oxide, argon and helium.

Those skilled in the art and guided by the teachings herein provided will further appreciate that such pressurized or compressed contents can appropriately be stored or contained in the second chamber 16 in gaseous, liquid or multi-phase form (i.e., partially gaseous and partially liquid mixture). As will be appreciated, the premium on size generally placed on modem vehicle design, generally results in a preference for smaller sized airbag inflators. In view thereof and the fact that the densities for such materials are significantly greater when in a liquid, rather than gaseous form, storage of such oxidant compressed gas materials at least partially in a liquid form will typically be preferred. Thus, in accordance with one preferred embodiment of the invention, the second chamber contents 42 contain a partially liquified mixture of nitrous oxide and carbon dioxide.

The second chamber 16 is closed and the contents 42 thereof appropriately held therewithin from fluid communication with the diffuser assembly 20 by means of a closure 44 such as composed of a wall 46 with a burst or rupture disc 48. Those skilled in the art and guided by the teachings herein provided will appreciate that closures of other suitable types or forms can desirably be used in the practice of the invention and the broader practice of the invention is not necessarily limited to particular or specific types or forms of closures.

The diffuser assembly 20 defines a diffuser chamber 50 and includes a plurality of diffuser orifices 52 for dispensing inflation gas from the inflator 10 into an associated inflatable airbag cushion (not shown).

In accordance with a preferred practice of the invention, the fuel precursor is at least in part reactive with water such as to desirably make, produce or otherwise form a suitable fuel material for use in gas generation. The process whereby water causes or results in the decomposition of a substance is defined or commonly referred to as "hydrolysis." The hydrolysis reactions which are of interest in the practice of the invention are those hydrolysis reactions that form or create, as a product, a fuel, i.e., a material that can be oxidized by a gaseous or liquid oxidizer to produce energy. As will be appreciated, various product fuels are possible or can be used in the practice of the invention. For example, and without necessarily limiting the broader practice of the invention, product fuels used in the practice of the invention may include hydrogen, as well as hydrocarbon-based fuels such as hydrocarbon and hydrocarbon derivative fuels.

A wide variety of suitable water-reactive fuel precursor materials are available for use in the practice of the invention. For example, suitable water-reactive fuel precursor materials for use in the practice of the invention include but are not necessarily limited to various metal element-containing materials including: hydrides, carbides, alkoxides, metals (particularly alkali metals) or organometallic compounds bonded to carbonates or bicarbonates, and combinations thereof. Metal alkoxides (e.g., alkali or alkaline earth metal salt of an alcohol) are a particularly preferred water-reactive fuel precursor material for use in the practice of the invention. Particularly preferred fuel precursor materials for use in the practice of the invention include potassium t-butyl carbonate and potassium tert-butoxide.

With regard to fuel precursor materials such as potassium t-butyl carbonate, it is believed that such material, as used in a preferred practice of the invention, may be in the form of a physical mixture of potassium carbonate and potassium tert-butoxide, with the carbonate believed to be present due to absorption of carbon dioxide by the basic alkoxide. At this time, it is believed that the carbonate in such a mixture act as a ballistic modifier and thus modify the rate of release or formation of the associated fuel.

Similarly, a wide variety of suitable water-supplying compounds are available for use in the practice of the invention. For example, suitable water-supplying compounds for use in the practice of the invention include inorganic hydrated compounds, particularly such inorganic compounds with stabilized waters of hydration. In general, compounds where an ion or a group of ions are said to be hydrated if water is bound (such as electrostatically or through an ionic bond, for example) in the crystalline structure. An example of one such preferred water-supplying compound is hydrated calcium oxylate.

A particularly preferred water-supplying compound for use in the practice of the invention is ammonium nitrate ($NH_4NO_3$). Desirable features or characteristics of ammonium nitrate may include: low cost, ready availability and high gas yield, for example. While a complete decomposition mechanism for ammonium nitrate is beyond the scope of the invention, generally speaking ammonium nitrate will produce water in accordance with the following reaction:

$$NH_4NO_3 \Leftrightarrow N_2O + 2H_2O \qquad (1)$$

Further, as the general incorporation and use of ammonium nitrate in various formulations has, in the past, been subject to certain difficulties relating to phase or structural changes in crystalline structure, various phase-stabilized forms of ammonium nitrate have been developed. For example, stabilization of ammonium nitrate compositions can be achieved or realized through the inclusion of a transition metal salt and, in particular, a copper II salt material. Suitable copper salt materials can include copper sulfate, copper chloride and copper phosphate, for example. In addition, ammonium nitrate phase stabilization can desirably be realized through the inclusion of an effective amount of copper or other transition metal diammine dinitrate, one or more alkali metal nitrates or combinations thereof.

Other water-supplying compounds which can be used in the practice of the invention include but are not necessarily limited to ammonium nitrite ($NH_4NO_2$), ammonium perchlorate ($NH_4ClO_4$), ammonium permanganate ($NH_4MnO_4$), and ammonium peroxydisulfate ($(NH_4)_2S_2O_8$). In particular, such water-supplying compounds may react in accordance with the following chemical reactions to produce or form product water:

$$NH_4NO_2 \Leftrightarrow N_2 + 2H_2O \qquad (2)$$

$$2NH_4ClO_4 \Leftrightarrow N_2 + Cl_2 + 4H_2O + 2O_2 \qquad (3)$$

$$2NH_4MnO_4 \Leftrightarrow 2MnO + N_2 + 4H_2O + O_2 \qquad (4)$$

$$3(NH_4)_2S_2O_8 \Leftrightarrow 4NH_3 + N_2 + 6SO_2 + 6H_2O + 3O_2 \qquad (5)$$

From the above identified chemical reactions, it can be appreciated that the use of ammonium perchlorate ($NH_4ClO_4$) will in general not be preferred due to concerns arising from chlorine formation and possible subsequent emission. Also, the use of ammonium peroxydisulfate ($(NH_4)_2S_2O_8$) will in general not be preferred due to concerns arising due to the formation and possible subsequent emission of oxides of sulfur.

The water produced or formed by or from the water-supplying compound may then be used or employed in reaction with a water-reactive fuel, precursor material such as described above, to form or produce a desired fuel material.

In operation such as upon the sensing of the occurrence of a collision, an electrical signal is sent to the initiator device 12. The initiator device 12 functions and when it is a pyrotechnic-containing initiator, discharges high temperature combustion products into the first chamber 14 and specifically into the first volume 30 and the contents 34 thereof and into the second volume 32 and the contents 36 thereof. For example, the pressure and/or shock generated by the discharge of the initiator device 12 can in practice serve to rupture or otherwise open the wall or barrier 40 between the first and the second volumes, 30 and 32, respectively, and to rupture or otherwise open the first chamber 14 to permit open fluid communication with the second chamber 16.

Such initiator discharge is effective to cause or result in reaction of at least a portion of the water-supplying compound initially contained within the first chamber 14 such as to produce or otherwise form water. The water, liberated or produced upon decomposition or reaction of the water-supplying compound, reacts rather quickly with at least a portion of the water-reactive fuel precursor initially contained within the first chamber 14 to produce or otherwise form a quantity of fuel material such as used in gas generation. Such reaction is further driven toward completion as a result of high temperatures such as produced or resulting from a pyrotechnic-containing initiator, such as described above.

For example, in accordance with one preferred embodiment of the invention, the water-supplying compound ammonium nitrate reacts to produce water which in turn reacts with the fuel precursor material potassium t-butyl carbonate to yield a hydrocarbon fuel material, such as preferably butyl alcohol in this case.

At least a portion of the quantity of fuel material is released or discharged from the first chamber 14 into the second chamber 16 and in fluid communication with the oxidant-including second chamber contents 42. The fuel material produced or resulting from reaction of the water-reactive fuel precursor material with water in turn reacts with the oxidant such as to produce heat and additional gaseous products. In such operation, the pressure within the second chamber 16 is increased due to either or both the pressure impulse resulting from the firing of the initiator device 12 and the increase in temperature and relative volume of gaseous products resulting from reaction the in situ formed fuel and the oxidant material.

When the gas pressure within the second chamber 16 exceeds the structural capability of the burst disc 48, the disc ruptures of otherwise permits the passage of the inflation gas into the diffuser chamber 50 and thus allows this inflation gas to vent through the diffuser orifices 52 into an associated airbag assembly.

Figure 2A:
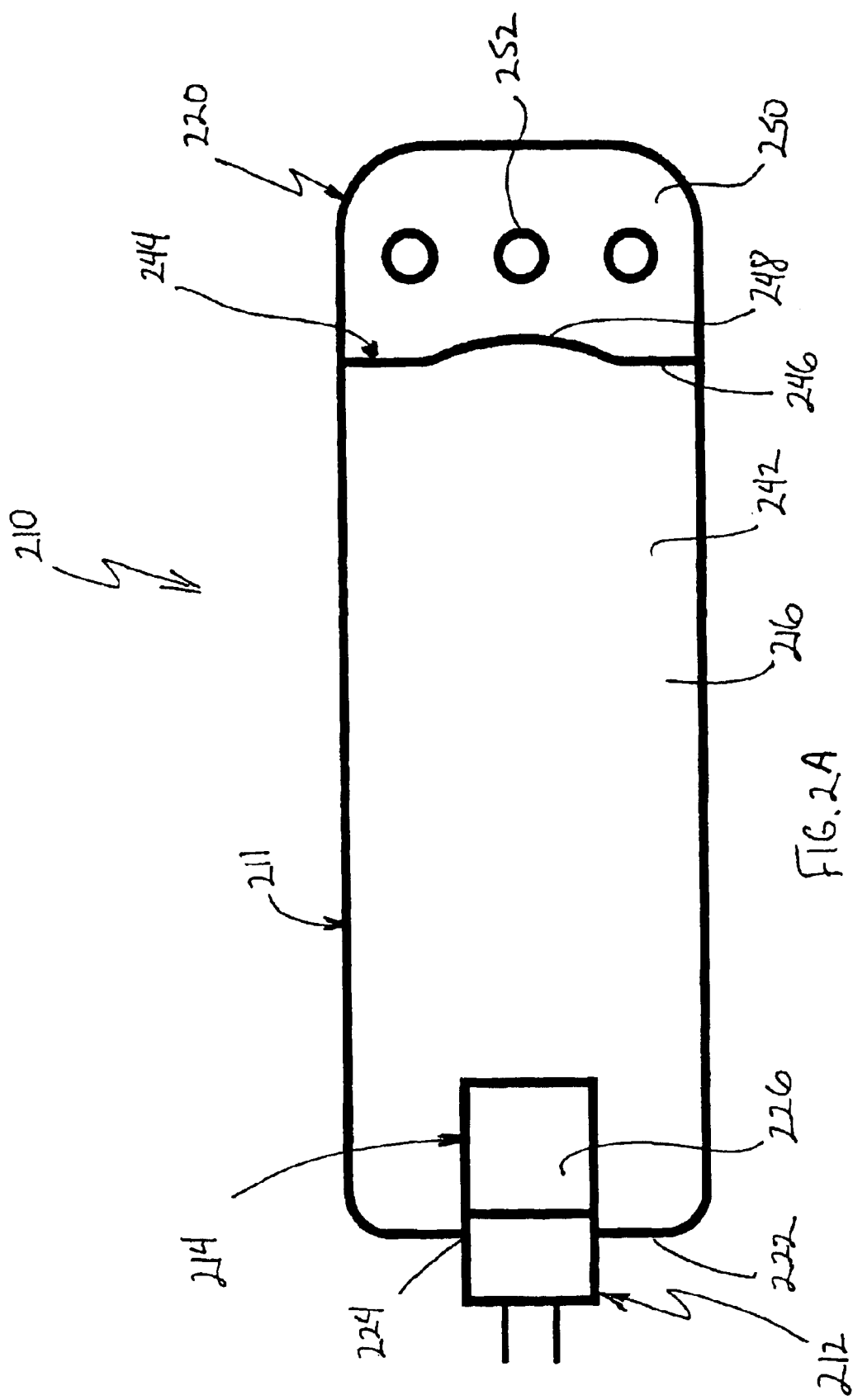
FIG. 2A is a simplified, partially in section, schematic drawing of a vehicle occupant safety assembly in accordance with an alternative preferred embodiment of the invention.

While the inflator 10 shown in FIG. 1 and described above seeks separately to store or contain the water-reactive fuel precursor and the water-supplying compound, it will be appreciated that the broader practice of the invention is not necessarily so limited. For example, FIG. 2A illustrates an inflator 210 in accordance with an alternative preferred embodiment of the invention. The inflator 210 is generally similar to the inflator 10, described above. In particular, the inflator 210 is an assembly which comprises a pressure vessel 211. The inflator assembly 210 also includes an initiator device 212, such as described above. Also, similar to the inflator assembly 10, the inflator assembly 210 includes a first chamber 214, a second chamber 216, and a diffuser assembly 220. Further, the inflator 210 includes a first end wall 222. The end wall 222 has an opening 224 therein, wherethrough the initiator device 212 is attached in sealing relation, such as described above.

The first chamber 214 is adjacently situated to the initiator device 212 in discharge communication therewith. In the illustrated static or at rest condition, the first chamber 214 is closed and has contents, designated by the reference numeral 226. The first chamber contents 226 include a quantity of a water-supplying compound and a quantity of a water-reactive fuel precursor, such as water-supplying compounds and water-reactive fuel precursor materials such as described above. In this inflator assembly embodiment, however, the water-supplying compound and the water-reactive fuel precursor, rather than being stored in a segregated fashion are permitted to be in direct contact within the first chamber 214.

In the illustrated static or at rest condition for the inflator 210, the second chamber 216 is closed and has contents, designated by the reference numeral 242, therein contained. Similar to the second chamber 42 of the inflator 10 described above, the second chamber contents 242 desirably include a quantity of pressurized stored gas including a supply of oxidant material such as described above and such as may appropriately react with a fuel material to form or produce a supply of gaseous products such as may be used in the inflation of an associated inflatable airbag cushion. Also, as described above relative to the inflator 10, the second chamber contents 242 may, if desired, additionally contain or include one or more inert materials such as argon or helium, for example.

Similar to the inflator 10 described above, the second chamber 216 is closed and the contents 242 thereof appropriately held therewithin from fluid communication with the diffuser assembly 220 by means of a closure 244 such as composed of a wall 246 with a burst or rupture disc 248. Also, the diffuser assembly 220 similarly defines a diffuser chamber 250 and includes a plurality of diffuser orifices 252 for dispensing inflation gas from the inflator 210 into an associated inflatable airbag cushion (not shown).

In operation such as upon the sensing of the occurrence of a collision, an electrical signal is sent to the initiator device 212. The initiator device 212 functions and when it is a pyrotechnic-containing initiator, discharges high temperature combustion products into the first chamber 214. Such initiator discharge is effective to cause or result in reaction of at least a portion of the water-supplying compound initially contained within the first chamber 214 such as to produce or otherwise form water. The water, liberated or produced upon decomposition or reaction of the water-supplying compound, reacts with at least a portion of the water-reactive fuel precursor initially contained within the first chamber 214 to produce or otherwise form a quantity of fuel material such as used in gas generation, such as described above.

At least a portion of the quantity of fuel material is released or discharged from the first chamber 214 into the second chamber 216 and in fluid communication with the oxidant-including second chamber contents 242. The fuel material produced or resulting from reaction of the water-reactive fuel precursor material with water in turn reacts with the oxidant such as to produce heat and additional gaseous products. In such operation, the pressure within the second chamber 216 is increased due to either or both the pressure impulse resulting from the firing of the initiator device 212 and the increase in temperature and relative volume of gaseous products resulting from reaction the in situ formed fuel and the oxidant material.

When the gas pressure within the second chamber 216 exceeds the structural capability of the burst disc 248, the disc ruptures of otherwise permits the passage of the inflation gas into the diffuser chamber 250 and thus allows this inflation gas to vent through the diffuser orifices 252 into the associated airbag assembly.

As will be appreciated, such an assembly wherein the water-supplying compound and the water-reactive fuel precursor are stored or contained within the first chamber 214 without the need for the incorporation or inclusion of features added to avoid or prevent direct contact therebetween while in a static state or condition can significantly simply one or more of inflator design, manufacturing cost and operation.

Figure 2B:
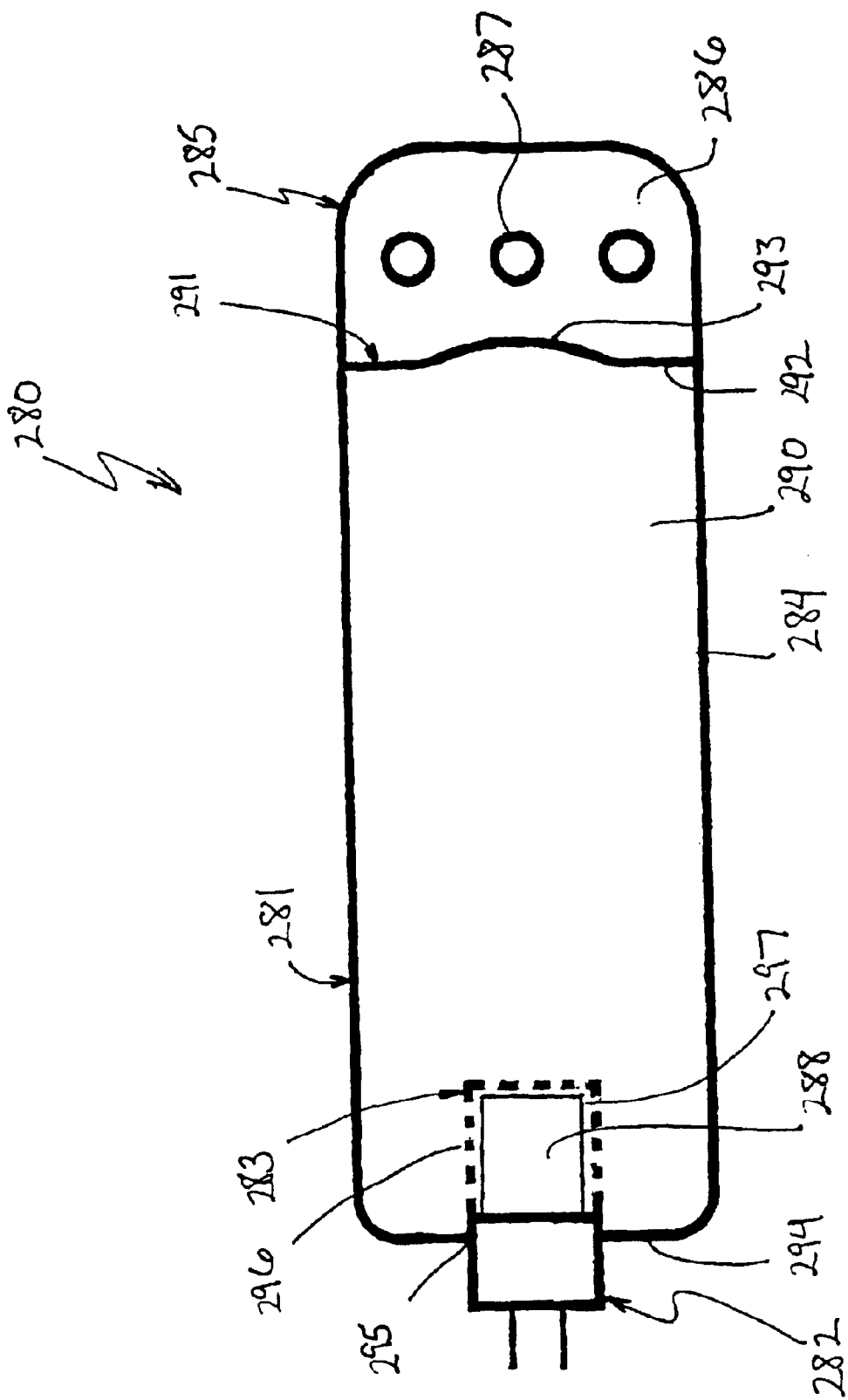
FIG. 2B is a simplified, partially in section, schematic drawing of a vehicle occupant safety assembly in accordance with another preferred embodiment of the invention.

Further possible simplifications can be achieved through the use of an assembly in accordance with the invention wherein the water-supplying compound and the water-reactive fuel precursor are generally stored or contained within the first chamber without necessarily requiring that the first chamber be closed or the contents of the first chamber be contained therein in a sealed fashion and thus necessarily separated from the pressured contents of the second chamber, while inflator is in a static state or condition. For example, FIG. 2B illustrates an inflator 280 in accordance with one such alternative preferred embodiment of the invention. The inflator 280 is generally similar to the inflator 210, described above. In particular, the inflator 280 is an assembly which comprises a pressure vessel 281. The inflator assembly 280 includes: an initiator device 282, a first chamber 283, a second chamber 284, and a diffuser assembly 285. The diffuser assembly 285 defines a diffuser chamber 286 and includes a plurality of diffuser orifices 287 for dispensing inflation gas from the inflator 280 into an associated inflatable airbag cushion (not shown).

The first chamber 283 has contents, designated by the reference numeral 288. The second chamber 284 is closed and has contents, designated by the reference numeral 290, which are appropriately held therewithin from fluid communication with the diffuser assembly 285 by means of a closure 291 such as composed of a wall 292 with a burst or rupture disc 293.

The inflator 280 includes a first end wall 294 having an opening 295 therein, wherethrough the initiator device 282 is attached in sealing relation, such as described above.

The first chamber 283 is similarly adjacently situated to the initiator device 282, in discharge communication therewith. The first chamber contents 288, similar to the above-described embodiment, include a quantity of a water-supplying compound and a quantity of a water-reactive fuel precursor, such as water-supplying compounds and water-reactive fuel precursor materials such as described above. The second chamber contents 290, similar to the above-described embodiment, desirably include a quantity of pressurized stored gas including a supply of oxidant material such as described above and such as may appropriately react with a fuel material to form or produce a supply of gaseous products such as may be used in the inflation of an associated inflatable airbag cushion. Also, as described, the second chamber contents 290 may, if desired, additionally contain or include one or more inert materials such as argon or helium, for example.

In the inflator assembly 280, however, the first chamber contents 288 are not contained therein in a sealed fashion (i.e., hermetically sealed) and thus necessarily separated from the pressurized second chamber contents 290, while the inflator 280 is in a static state or condition. To that end and as shown in FIG. 2B, the first chamber 283 is defined at least in part by a perforated housing 296, such that the first chamber contents 288, e.g., including a water-supplying compound and a water-reactive fuel precursor, are in contact with the pressurized second chamber contents 290, while the inflator 280 is in a static state or condition.

As will be appreciated by those skilled in the art and guided by the teachings herein provided, such a perforated housing 296 can be variously constructed without departing from the practice of the invention in its broader terms. For example, the perforated housing 296 can simply be a rolled screen such as with a screen plug or cap welded, crimped or otherwise joined or attached to the end thereof. Alternatively, the perforated housing 296 can be fabricated, from a perforated material such as to form a closed end cylinder or "can." The material used in such a structure can be perforated by various means or devices such as by drill or punch, for example. Further, while perforated housings in accordance with the invention can be fabricated of various suitable materials of construction, in practice such perforated housings can typically be formed of metal, such as of a plain or a stainless steel, for example. Further, those skilled in the art and guided by the teachings herein provided will appreciate that design parameters such as the location, number, and area of perforations in a particular perforated housing can, in accordance with the invention, be selected to meet the requirements of a particular installation.

In addition, if desired and as may be preferred in at least certain embodiments, the inflator assembly 280 may additionally contain or include a foil liner, generally designated by the reference numeral 297, within the first chamber perforated housing 296. Such a first chamber liner 297 can be fabricated or constructed of various materials. For example, without unnecessarily limiting the broader practice of the invention, such a liner can be fabricated of a thin metal such as a foil of aluminum. As will be appreciated, the inclusion or use of such a first chamber liner 297 can desirably serve to may maintain the first chamber reactant contents in close proximity, e.g., in discharge communication proximity, to the initiator device 282 without requiring the rigorous manufacturing steps normally associated with sealed chambers or containers and the leak checking thereof Further, as the liner 297 desirably is relative thin, the liner is easily ruptured when the initiator device 282 functions and discharges high temperature combustion products thereagainst and into the first chamber 288. As described above, such initiator discharge is desirably effective to cause or result in reaction of at least a portion of the water-supplying compound initially contained within the first chamber 288 such as to produce or otherwise form water. The water, liberated or produced upon decomposition or reaction of the water-supplying compound, reacts with at least a portion of the water-reactive fuel precursor initially contained within the first chamber 288 to produce or otherwise form a quantity of fuel material such as used in gas generation, such as described above. If necessary, the foil liner 297 may further rupture, tear or open so as to allow or permit such fuel material to flow through the perforations in the housing 296 and into direct contact with the second chamber contents 290 and subsequent reaction, as described above.

The inclusion of such a liner can serve to ensure that the reactants do not accidentally or unintentionally escape the perforated housing which forms a portion of the first chamber. For example, through the inclusion of such a liner, the first chamber reactants will generally be retained within the first chamber even when the subject inflator has undergone a change in orientation or is subjected to vibrations, such as during or after installation.

Figure 3:
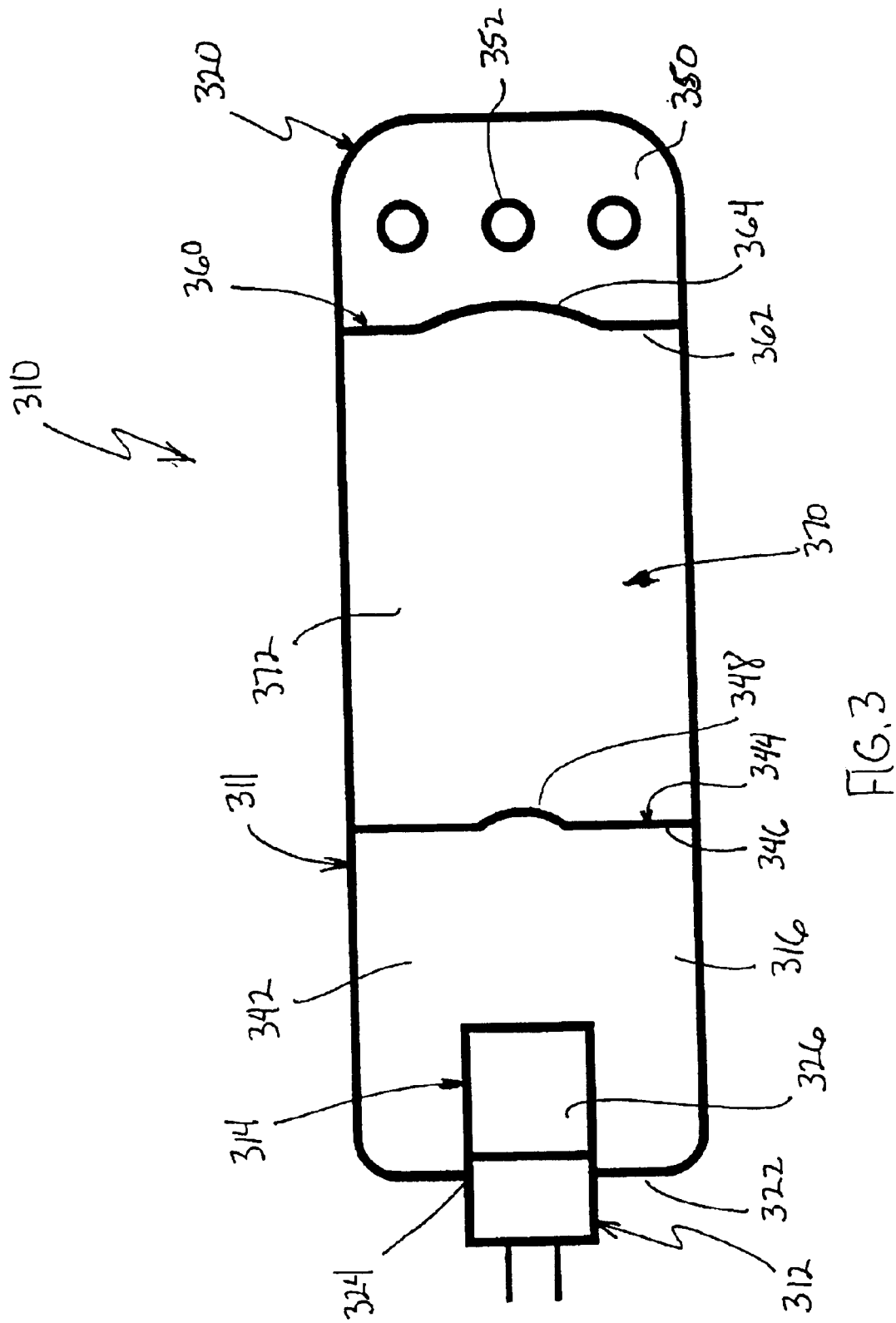
FIG. 3 is a simplified, partially in section, schematic drawing of a vehicle occupant safety assembly in accordance with another preferred embodiment of the invention.

FIG. 3 illustrates, in accordance with an alternative embodiment of the invention, an inflator designated by the reference numeral 310. The inflator 310 is generally similar to the inflator 210, described above, and includes a pressure vessel 311, an initiator device 312, a first chamber 314, a second chamber 316, and a diffuser assembly 320. The inflator 310 includes a first end wall 322 having an opening 324 therein wherethrough the initiator device 312 is attached in sealing relation, such as described above.

The first chamber 314 is situated adjacent the initiator device 312 in discharge communication therewith. In the illustrated static or at rest condition, the first chamber 314 is closed and contains contents 326 which include a quantity of a water-supplying compound and a quantity of a water-reactive fuel precursor, such as described above and in direct contact with each other. In the illustrated static or at rest condition, the second chamber 316 is also closed and has oxidant-including contents 342, such as described above. In such static or at rest condition, the second chamber contents 342 are appropriately held therewithin by means of a closure 344 such as composed of a wall 346 with a burst or rupture disc 348.

The diffuser assembly 320, similar to the diffuser assembly 220 described above, defines a diffuser chamber 350 and includes a plurality of diffuser orifices 352 for dispensing inflation gas from the inflator 310 into an associated inflatable airbag cushion (not shown).

The inflator 310 primarily differs from the inflator 210 described above by the inclusion of a closure 360 interposed between the closure 344 and the diffuser assembly 320 and longitudinally spaced, respectively, therefrom. The closure 360, similar to the closure 344 can take various appropriate forms. For example and as shown, the closure 360 can, for example, take the form of a wall 362 with a burst or rupture disc 364. Those skilled in the art and guided by the teachings herein provided will, however, appreciate that the closure 360 can be variously appropriately constructed or formed and thus the broader practice of the invention is not necessarily limited to the use or incorporation of specific forms of closures.

Through the inclusion of the closure 360, a storage chamber, designated by the reference numeral 370, is formed between the oxidant material-containing chamber closure 344 and the diffuser assembly 320. In the static state or condition, the storage chamber 370 is closed and has contents, herein designated by the reference numeral 372. In accordance with a preferred practice of the invention, the storage chamber 370 can advantageously be employed to store or otherwise contain one or more inert gases such as argon, helium or mixtures of such or other inert gases at pressures typically in the range of about 2000 psi (13.8 MPa) to about 5000 psi (34.5 MPa). In view thereof, the chamber 370 is sometimes hereinafter referred to as an "inert gas storage chamber" and the burst disc 364 is sometimes correspondingly referred to as the "inert gas chamber burst disc."

In operation such as upon the sensing of the occurrence of a collision, an electrical signal is sent to the initiator device 312. The initiator device 312 functions and when it is a pyrotechnic-containing initiator, discharges high temperature combustion products into the first chamber 314. Such initiator discharge is effective to cause or result in reaction of at least a portion of the water-supplying compound initially contained within the first chamber 314 such as to produce or otherwise form water. The water, liberated or produced upon decomposition or reaction of the water-supplying compound, reacts with at least a portion of the water-reactive fuel precursor initially contained within the first chamber 314 to produce or otherwise form a quantity of fuel material such as used in gas generation, such as described above.

At least a portion of the quantity of fuel material is released or discharged from the first chamber 314 into the second chamber 316 and in fluid communication with the oxidant-including second chamber contents 342. The fuel material produced or resulting from reaction of the water-reactive fuel precursor material with water in turn reacts with the oxidant such as to produce heat and additional gaseous products. In such operation, the pressure within the second chamber 316 is increased due to either or both the pressure impulse resulting from the firing of the initiator device 312 and the increase in temperature and relative volume of gaseous products resulting from reaction the in situ formed fuel and the oxidant material.

When the gas pressure within the second chamber 316 exceeds the structural capability of the burst disc 348, the disc ruptures of otherwise permits the passage of a product inflow, such as may include one or more of heat, products gases and initiator discharge products, into the inert gas storage chamber 370. The inert gas therein contained can desirably serve to quench or stop further combustion between remaining fuel and oxidant materials or dissociation of nitrous oxide oxidant material such as to produce nitrogen gas such as may be used to inflate an associated inflatable airbag cushion.

The product inflow into the inert gas chamber results in a pressure increase therewithin. When the gas pressure within the inert gas storage chamber 370 exceeds the structural capability of the burst disc 364, the disc ruptures of otherwise permits the passage of inflation gas into the diffuser chamber 350 and thus allows this inflation gas to vent through the diffuser orifices 352 into the associated airbag assembly.

Those skilled in the art and guided by the teachings herein provided will appreciate that an inflator, similar to the inflator 310, but now with the water-supplying compound stored within the first chamber in a segregated manner from the quantity of the fuel precursor can be used, if desired and such as described above.

Figure 4:
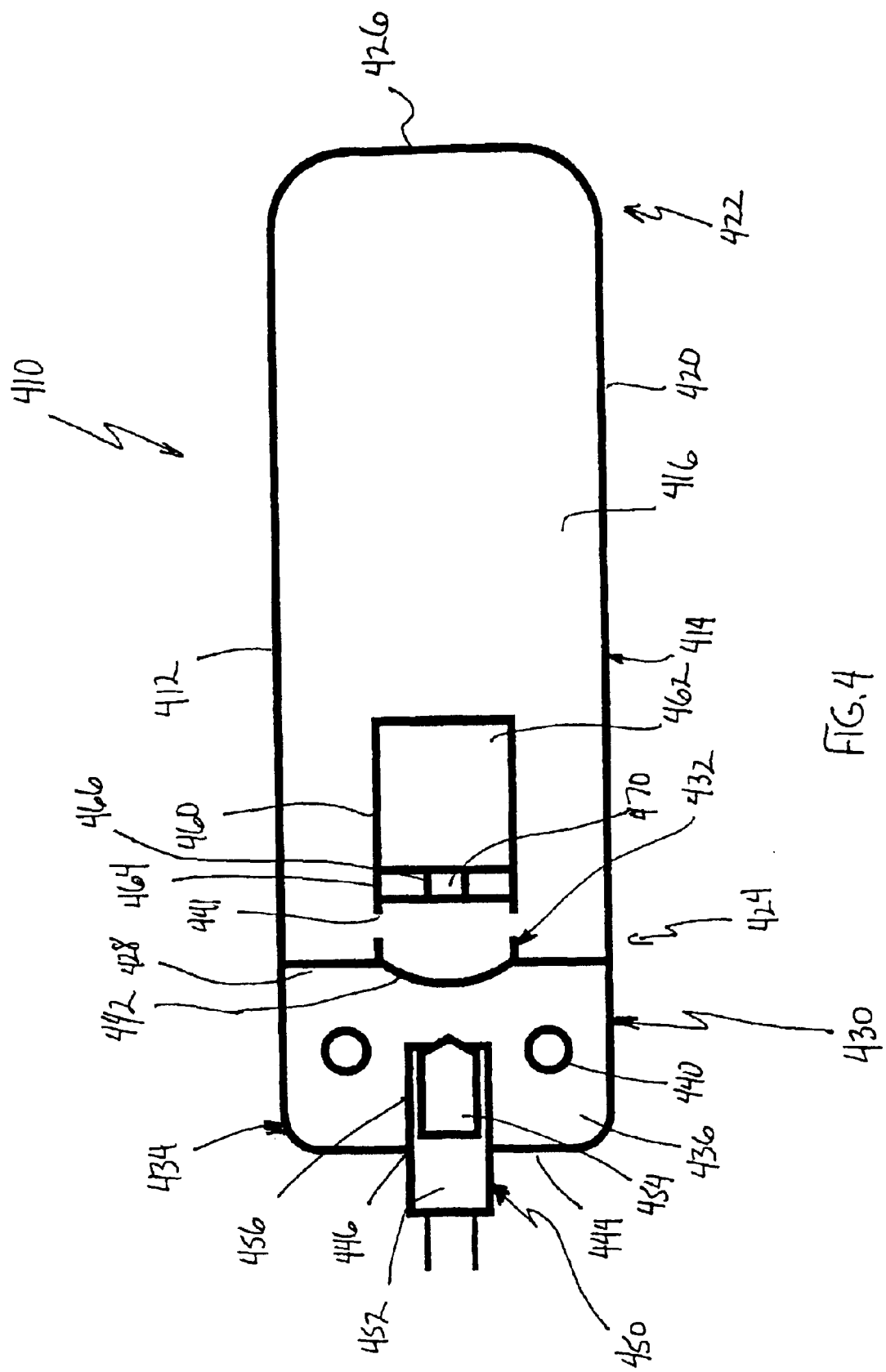
FIG. 4 is a simplified, partially in section, schematic drawing of a vehicle occupant safety assembly in accordance with yet another preferred embodiment of the invention.

FIG. 4 illustrates an inflator assembly 410 in accordance with another embodiment of the invention. The inflator assembly 410 includes a pressure vessel 412 at least in part forming a storage chamber 414 having contents, here designated by the reference numeral 416, which include a supply of oxidant material such as described above.

The chamber 414 is generally defined by an elongated cylindrical sleeve 420 having a first end 422 and a second end 424. The sleeve first end 422 is closed by means of an end wall 426. The end wall 426 can be formed continuous and in one piece with the cylindrical sleeve 420, as shown. Alternatively, the end wall 426 can be appropriately joined to or connected with the cylindrical sleeve such as by means of a weld or other suitable means, as may be desired. The inflator assembly 410 also includes a wall portion or segment 428 at least partially closing the sleeve second end 424.

An initiator and diffuser assembly combination 430 is attached at the sleeve second end 424 in sealing relation such as by a weld, crimp or other suitable hermetic seal. The initiator and diffuser assembly combination 430 includes a base portion 432 projecting into the chamber 414 and a cap portion 434 extending therefrom. The initiator and diffuser assembly combination 430 also defines a diffuser chamber 436 and includes a plurality of diffuser orifices 440 for dispensing inflation gas from the inflator 410 into an associated inflatable airbag cushion (not shown).

The base portion 432 includes a plurality of openings 441 such as to permit fluid communication of the chamber contents 416 thereinto. Fluid communication between the assembly combination base and cap portions 432 and 434, respectively, is normally prevented through the inclusion of appropriate sealing means, e.g., by means of a burst or rupture disc 442 or the like which is preferably generally impermeable to the storage chamber contents 416 but which, upon proper actuation, can rupture or otherwise open to permit flow therethrough and fluid communication to and with the assembly combination cap portion 434.

The initiator and diffuser assembly combination 430 also includes an end wall 444 having an opening 446 therein, wherethrough an opening means 450 such as suitable to open the sealing means, e.g., the burst disc 442, is attached in sealing relation, such as via a weld, crimp or other suitable hermetic seal. For example, the opening means 450 is illustrated in the form of a squib 452, an associated projectile 454 and a projectile barrel 456, the operation of which will be described in greater detail below.

Adjacent the diffuser chamber 436 there is included a storage chamber 460 having contents 462 which, in accordance with a preferred embodiment of the invention include a quantity of a water-supplying compound and a quantity of a water-reactive fuel precursor, such as described above. The water-supplying compound and the water-reactive fuel precursor material can be stored in direct contact with each other as described above. Alternatively, if desired, the water-supplying compound and the water-reactive fuel precursor material can be stored in segregated fashion such as described above.

The inflator assembly 410 also includes a wall or support ring 464 situated between the initiator and diffuser assembly combination base portion 432 and the storage chamber 460. The support ring 464 may, if desired and as shown, include an igniter storage volume 466 such as may used to store or contain an igniter material 470 such as including an appropriate primer material such as known in the art, such as of a lead styphnate tetracene type non-corrosive mixture and, if desired, a secondary ignition charge such as formed of boron potassium nitrate. The igniter material 470, when actuated, can desirably serve to initiate reaction of the water-supplying compound to form produce or otherwise release water and subsequently initiate reaction between such water and the water-reactive fuel precursor material stored or otherwise contained within the chamber 460 to produce the desired fuel material.

In operation, such as upon the sensing of a collision, an electrical signal is sent to the opening means 450 (e.g., the squib 452). Upon receipt of an appropriate signal, the opening means 450 is actuated such that the squib 452 fires and propels the projectile 454 through and out the projectile barrel 454 and into the burst disc 442 whereby the disc 442 ruptures or otherwise permits the passage of contents 416 from the storage chamber 414 through the diffuser chamber 436 and out through the diffuser orifices 440 into an associated airbag assembly. Thus, such an inflator device assembly will initially release generally unheated gas into the associated airbag cushion (not shown).

The projectile 454, after contacting and resulting in the opening of the rupture disc 442, proceeds to contact and initiate the igniter material 470, resulting in the ignition thereof and, in turn, initiation of the reaction of the water-supplying compound to form produce or otherwise release water and subsequently initiation of the reaction between such water and the water-reactive fuel precursor material stored or otherwise contained within the chamber 460 to produce the desired fuel material. This fuel material is discharged or otherwise released into the storage chamber 414 wherein the fuel material contacts with oxidant material therein contained. Reaction between the fuel and oxidant materials serves to heat the remaining contents of the chamber 414 prior to the release thereof through the diffuser chamber 436 and out of the diffuser orifices 440 into an associated inflatable airbag cushion.

Thus, the inflator device 410, which permits the initial release of generally unheated gas into an associated airbag cushion, can desirably produce or supply inflation gas in accordance with what is commonly referred to in the field as an "S" curve wherein an associated inflatable restraint airbag cushion is initially inflated in a relatively gradual manner soon followed by the passage of inflation gas into the airbag cushion at a relatively greater or increased pressure rate. As will be appreciated by those skilled in the art and guided by the teachings herein provided, inflators which provide or supply inflation gas in accordance with such "S" curve characteristics can be considered especially advantageous in those applications wherein a more gradual onset of deployment of an associated airbag cushion is desired. For example, in some inflatable restraint system applications it has been found sometimes desirable to employ such a more gradual onset of deployment of an associated airbag cushion in situations involving at least certain out-of-position vehicle occupants.

Further, it will be appreciated by those skilled in the art and guided by the teachings herein provided that the inflator assembly 410 can be variously constructed without departing from the practice of the invention. For example, in accordance with different embodiments of the invention, the wall segment 428 such as serves to at least partially close the sleeve second end 424 can be:

a. formed continuous and in one piece with the cylindrical sleeve 420, b. appropriately joined to or connected with the cylindrical sleeve such as by means of a weld or other suitable means, as may be desired, or c. incorporated as a part of the initiator and diffuser assembly combination 430.

Figure 5:
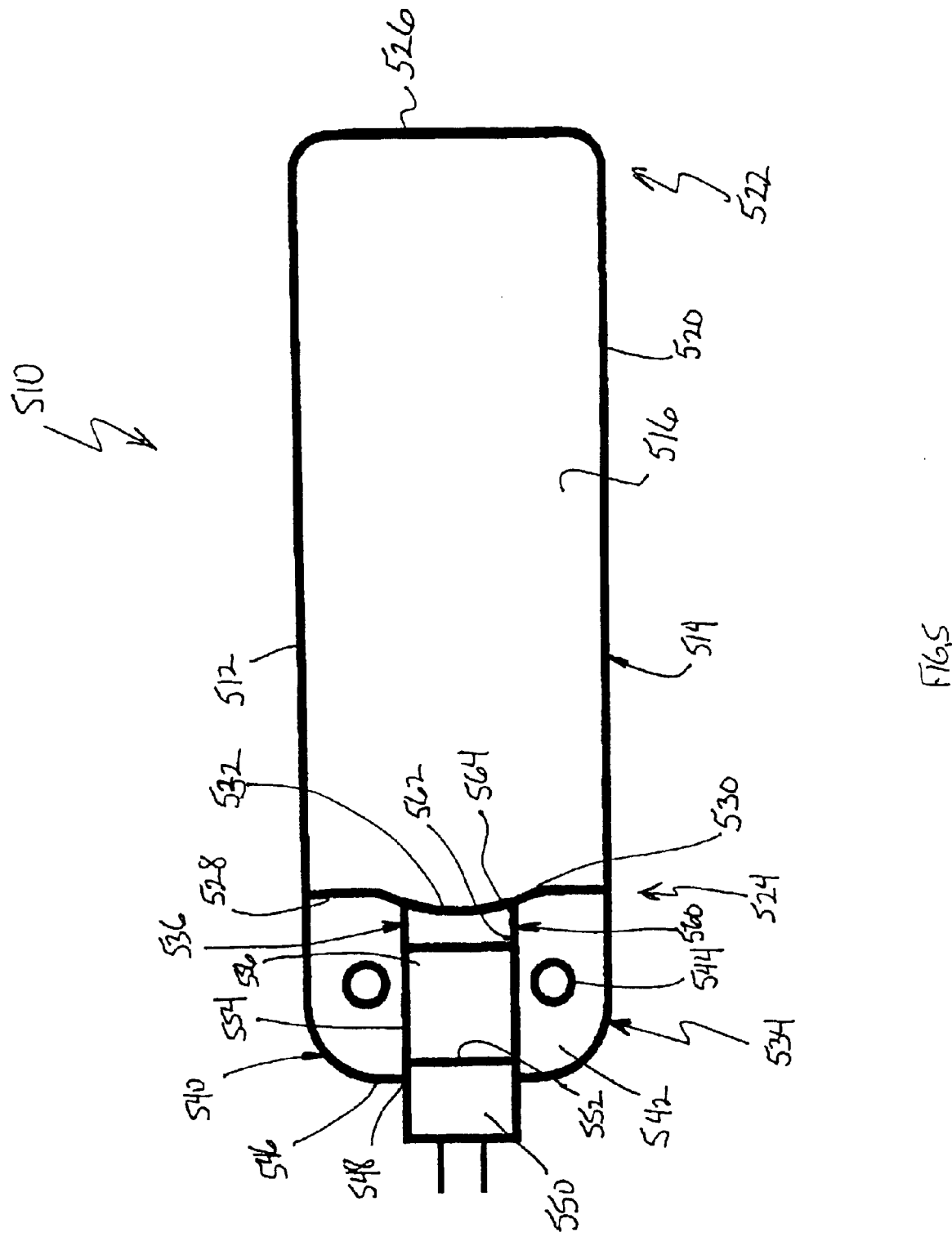
FIG. 5 is a simplified, partially in section, schematic drawing of a vehicle occupant safety assembly in accordance with yet still another preferred embodiment of the invention.

FIG. 5 illustrates an inflator assembly 510 in accordance with another embodiment of the invention. The inflator assembly 510 is in various respects similar to the inflator assembly 410 shown in FIG. 4 and described above. In particular, the inflator assembly 510, similar to the inflator assembly 410, includes a pressure vessel 512 at least in part forming a storage chamber 514 having contents, here designated by the reference numeral 516, which include a supply of oxidant material such as described above.

The chamber 514 is generally defined by an elongated cylindrical sleeve 520 having a first end 522 and a second end 524. The sleeve first end 522 is closed by means of an end wall 526. The end wall 526 can be formed continuous and in one piece with the cylindrical sleeve 520, as shown, or, alternatively, appropriately joined to or connected with the cylindrical sleeve such as by means of a weld or other suitable means, as may be desired. The inflator assembly 510 also includes a wall portion or segment 528 at least partially closing the sleeve second end 524. The wall portion 528 includes an opening 530 therein. The opening 530 is normally closed by sealing means, e.g., such as by means of a burst or rupture disc 532 such as secured and joined thereto in sealing relation such as is known in the art.

An initiator and diffuser assembly combination 534 is attached at the sleeve second end 524 in sealing relation such as by a weld, crimp or other suitable hermetic seal. The initiator and diffuser assembly combination 534 includes a base portion 536 and a cap portion 540 extending therefrom. The initiator and diffuser assembly combination 534 also defines a diffuser chamber 542 and includes a plurality of diffuser orifices 544 for dispensing inflation gas from the inflator 510 into an associated inflatable airbag cushion (not shown).

The initiator and diffuser assembly combination 534 also includes an end wall 546 having an opening 548 therein, wherethrough an initiator device 550 is desirably attached in sealing relation, such as via a weld, crimp or other suitable hermetic seal. The initiator device 550 includes a discharge end 552 whereat a discharge formed by the initiator device can be appropriately discharged or otherwise released.

The initiator and diffuser assembly combination 534 further includes a storage chamber 554 such as adjacent or in discharge communication with the initiator device 550. The storage chamber 554 has contents 556 which, in accordance with a preferred embodiment of the invention include a quantity of a water-supplying compound and a quantity of a water-reactive fuel precursor, such as described above. The water-supplying compound and the water-reactive fuel precursor material can be stored in direct contact with each other as described above. Alternatively, if desired, the water-supplying compound and the water-reactive fuel precursor material can be stored in segregated fashion such as described above.

The initiator and diffuser assembly combination 534 further includes or forms a support collar or ring 560 such as may desirably serve to support or otherwise reinforce the burst disc 532 against the pressures applied thereagainst due to the pressurized contents of the storage chamber 514. For example and as shown, the support collar 560 may include a first side 562 such as formed adjacent or extending from the storage chamber 554. The support collar 560 may also include a second side 564 such as whereagainst, in a static state, the burst disc 532 rests. Those skilled in the art and guided by the teachings herein provided will appreciate that such a supported burst disc arrangement can, at least in certain embodiments, result or lead to more effective rupture or opening of the associated burst disc and can thus result in an inflator device having or providing increased or improved repeatability in performance over a wide or wider range of operating conditions.

Further, through the inclusion of a support collar or the like such as described above, the associated burst disc may correspondingly be of reduced thickness as a supported burst disc of reduced thickness may tolerate pressures at which a corresponding unsupported disc would rupture or otherwise fail.

In operation, such as upon the sensing of a collision, an electrical signal is sent to the initiator 550. Upon receipt of an appropriate signal, the initiator 550 is actuated and, when it is a pyrotechnic-containing initiator, function to discharge high temperature combustion products into the chamber 554. Such initiator discharge is effective to cause or result in reaction of at least a portion of the water-supplying compound initially contained within the chamber 554 such as to produce or otherwise form water. The water, liberated or produced upon decomposition or reaction of the water-supplying compound, reacts with at least a portion of the water-reactive fuel precursor initially contained within the chamber 554 to produce or otherwise form a quantity of fuel material such as used in gas generation, such as described above.

At least a portion of the quantity of fuel material is then directed, such as by the support collar 560 through the burst disc 532 and into the chamber 514, such as contains a selected oxidant material.

As with the inflator device 410, described above, rupture or opening of the burst disc 532 permits the passage of contents 516 from the storage chamber 514 through the diffuser chamber 542 and out through the diffuser orifices 544 into an associated airbag assembly. Thus, such an inflator device assembly will initially release generally unheated gas into the associated airbag cushion (not shown).

Residual heat from the initiator 550 results in reaction of fuel formed in the inflator 510 with the originally stored oxidant such as to produce either or both additional gaseous products for use in the inflation of an associated airbag cushion or heat such as may be used to heat and thereby further expand the remaining contents of the chamber 514 prior to the release thereof through the diffuser chamber 542 and out of the diffuser orifices 544 into an associated inflatable airbag cushion.

Further, it will be appreciated by those skilled in the art and guided by the teachings herein provided that the inflator assembly 510 can be variously constructed without departing from the practice of the invention. For example, while the inflator assembly 510 has been described above with reference to the inclusion of a support collar in contact with and support of the burst disc 532 against the pressure applied thereagainst in the static state, the invention may be practiced employing an unsupported burst disc as inflator devices with an unsupported burst disc may facilitate either manufacture or assembly.

The present invention is described in further detail in connection with the following examples which illustrate or simulate various aspects involved in the practice of the invention. It is to be understood that all changes that come within the spirit of the invention are desired to be protected and thus the invention is not to be construed as limited by these examples.

EXAMPLES

Examples 1 and 2

In each of these examples, a test inflator similar in design to the inflator 510 shown in FIG. 5 was used except the test inflator included a projectile in association with the initiator for the subject experimental testing such as to physically ensure rupture of the burst disc rupture upon the proper actuation of the initiator. The test inflator in each of these examples had a diameter of 50 mm, an overall length of only 200 mm, a pressure vessel volume of 180.3 cc, a combustion chamber volume of 45.1 cc, a liquid fraction (at 21° C.) of approximately 80 percent (where the liquid fraction is expressed as the fraction of the total internal volume) and a density of reactants (as a bulk mixture) of approximately 0.564 g/cc.

The test inflator of Example 1 employed ammonium nitrate (as the water-supplying compound), potassium tert-butoxide (as the water-reactive fuel precursor) and a liquefied mixture of nitrous oxide and carbon dioxide (as oxidant). In particular, the Example 1 test inflator contained: 3.0 g of ammonium nitrate, 8.3 g of potassium tert-butoxide, 3.0 g of boron potassium nitrate pyrotechnic "booster" material. The booster charge was included primarily to ensure proper heating and, in turn, decomposition of the ammonium nitrate so as to form water. The liquefied gas charge was 122 g of a mixture of 40% nitrous oxide and 60% carbon dioxide (by volume). The Example 1 test inflator included, as a squib, a 275 mg zirconium potassium perchlorate device. The Example 1 test inflator also included four exit orifices each measuring 4.7 mm in diameter.

The Example 2 test inflator employed ammonium nitrate (as the water-supplying compound), potassium t-butyl carbonate (as the water-reactive fuel precursor) and a liquefied mixture of nitrous oxide and carbon dioxide (as oxidant). In particular, the Example 2 test inflator contained: 4.0 g ammonium nitrate, 10 g of potassium t-butyl carbonate, 4.0 g of boron potassium nitrate pyrotechnic "booster" material. Again, the booster charge was included primarily to ensure proper heating and, in turn, decomposition of the ammonium nitrate so as to form water. The liquefied gas charge was 122 g of a mixture of 50% nitrous oxide and 50% carbon dioxide (by volume). The Example 2 test inflator included as a squib a 460 mg titanium hydride potassium perchlorate (THPP) device. The Example 2 test inflator also included four exit orifices but here the exit orifices each measured 4.1 mm in diameter. The slight changes in geometry for the Example 2 test inflator were the result of the need to change the inflator geometry slightly to tailor the performance of the t-butyl carbonate system, compared to the potassium tert-butoxide system of Example 1.

The test inflators of Examples 1 and 2 were respectively fired into a test tank having an internal volume of 100 liters.

Figure 6:
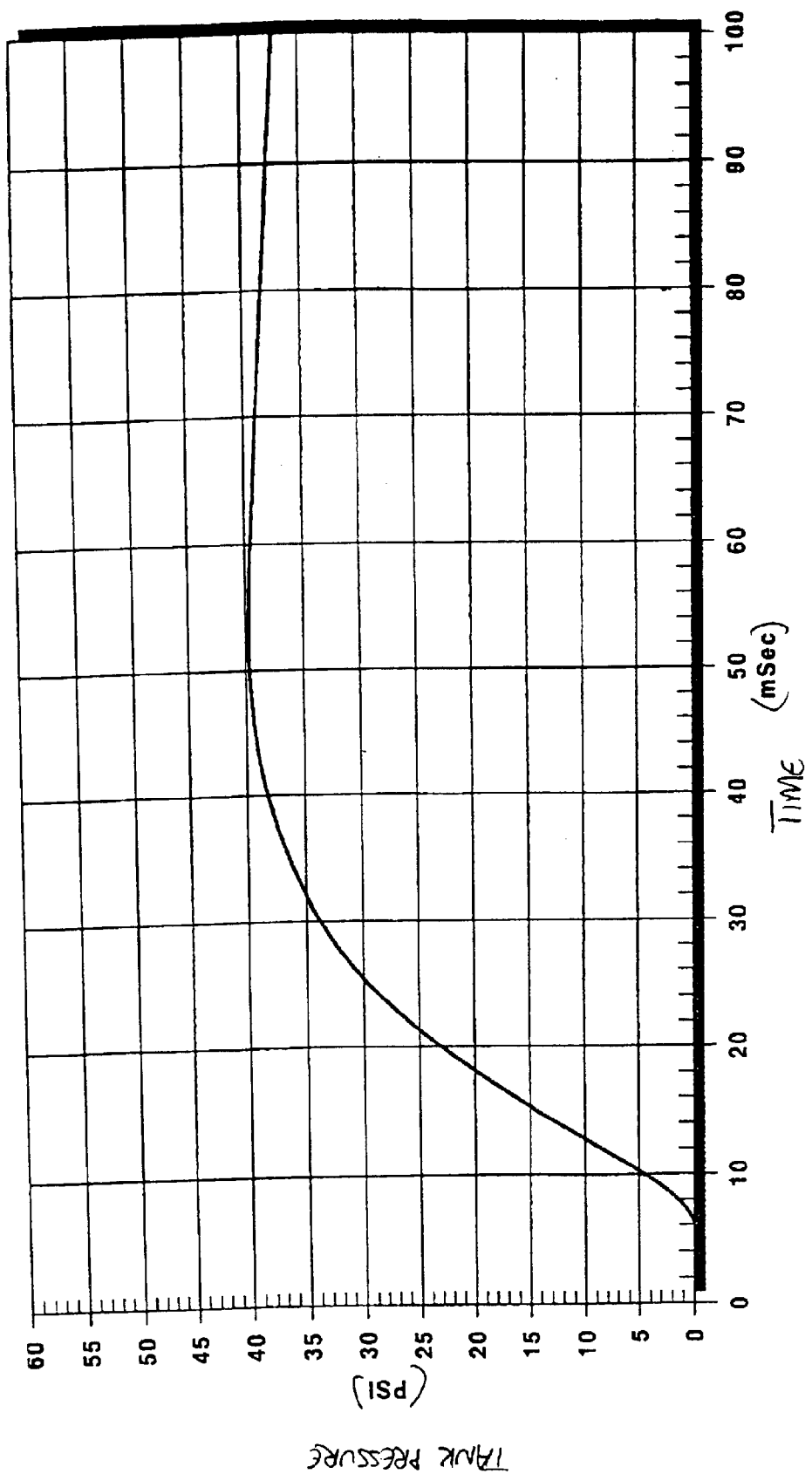
FIGS. 6 and 7 are graphical depictions of tank pressure as a function of time performance realized in the test tank for Examples 1 and 2, respectively.

The test tank pressure results (at 21° C.) realized in Example 1 are shown in FIG. 6. The characteristics of this curve (pressure rise rate and maximum pressure) are fairly typical of the inflator performance required to fill a standard 120 liter cushion, based on an expected 3.5 gmol molar output from the inflator device.

Figure 7:
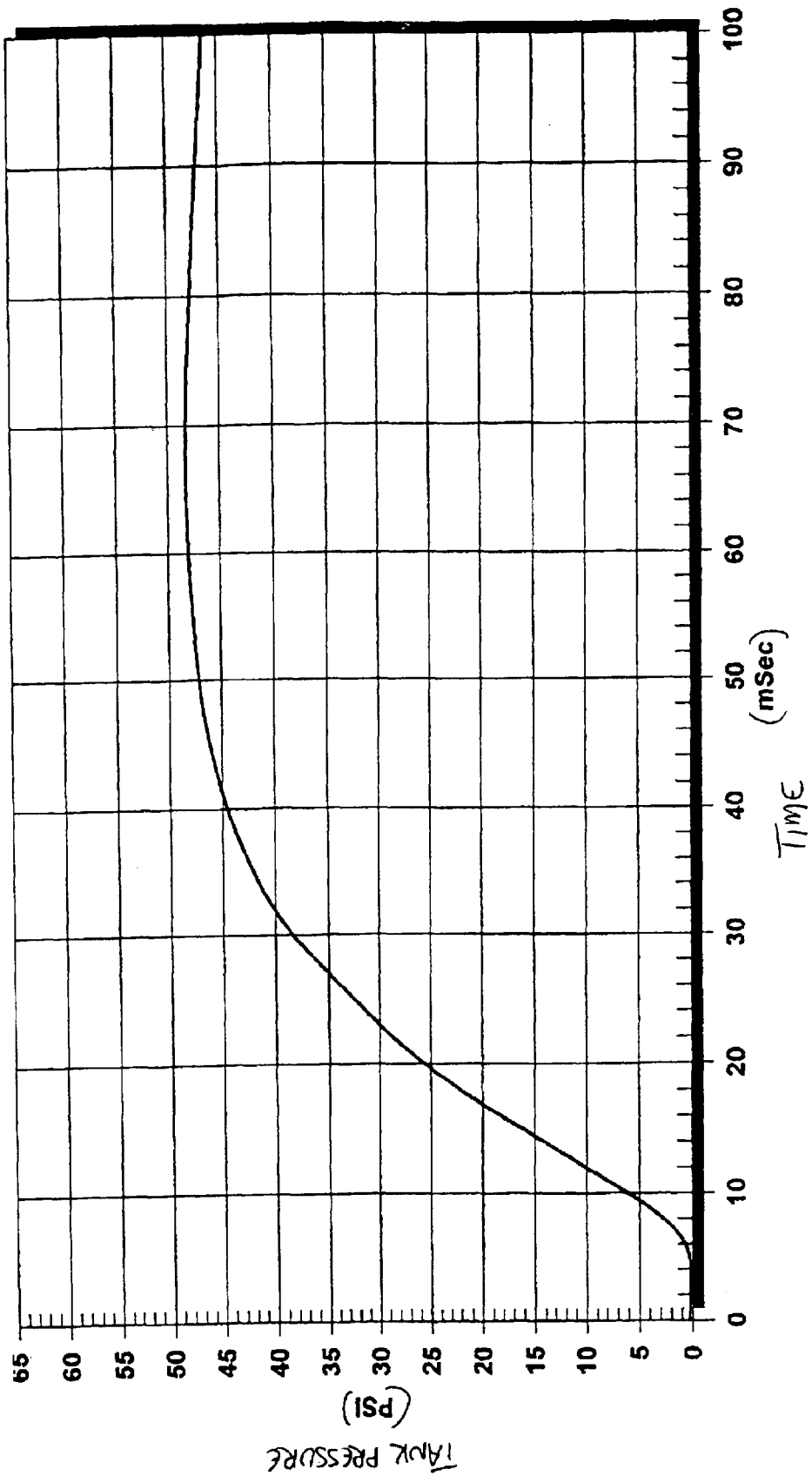

The test tank pressure results (21° C.) realized in Example 2 are shown in FIG. 7. The characteristics of this curve (pressure rise rate and maximum pressure) are again typical of what is required of an inflator to fill a standard 120 liter cushion, based on an expected 3.5 gmol molar output from the inflator device.

Figure 8:
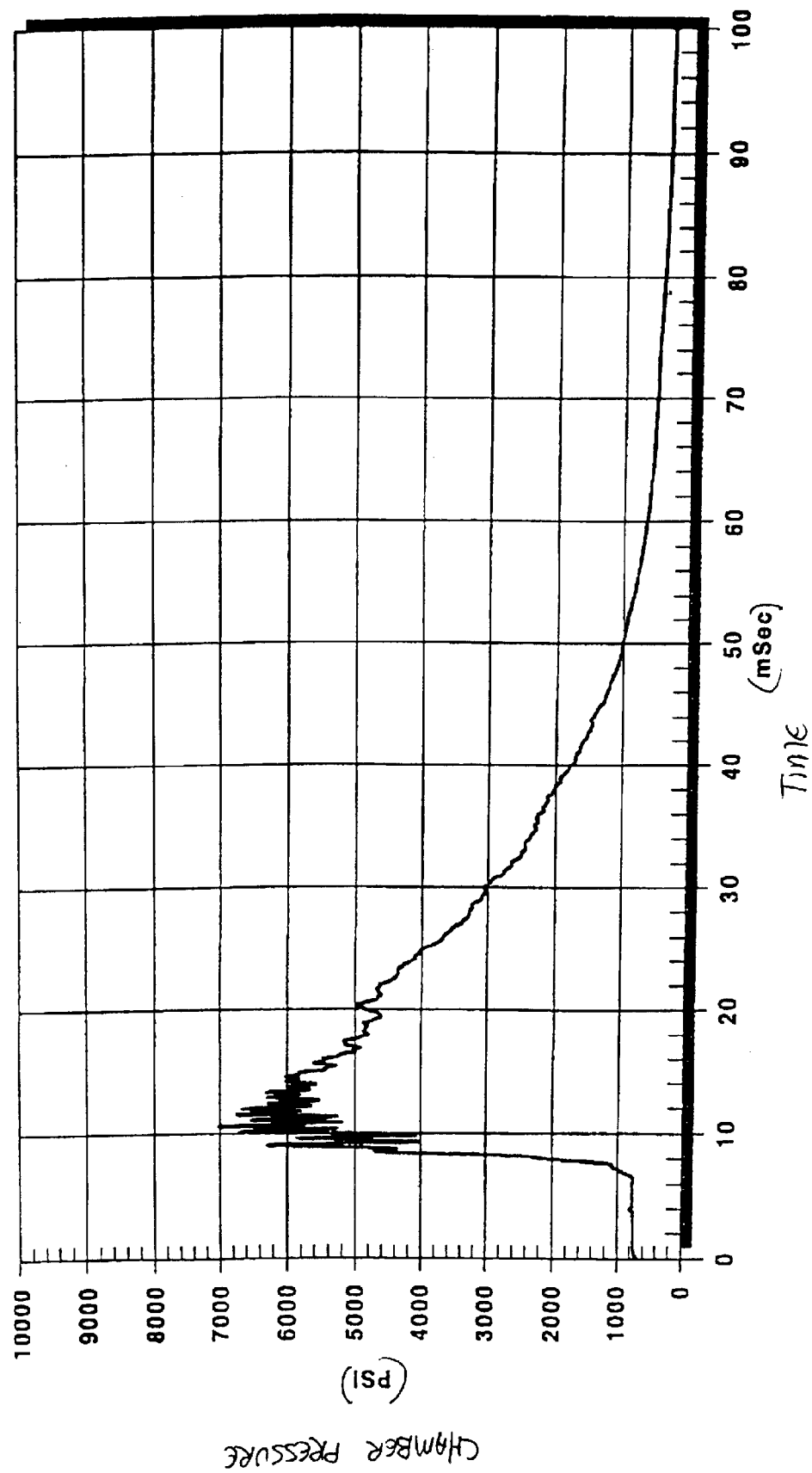
FIGS. 8 and 9 are graphical depictions of pressure within the test inflator pressure vessel as a function of time performance realized for the test inflators of Example 1 and 2, respectively.
Figure 9:
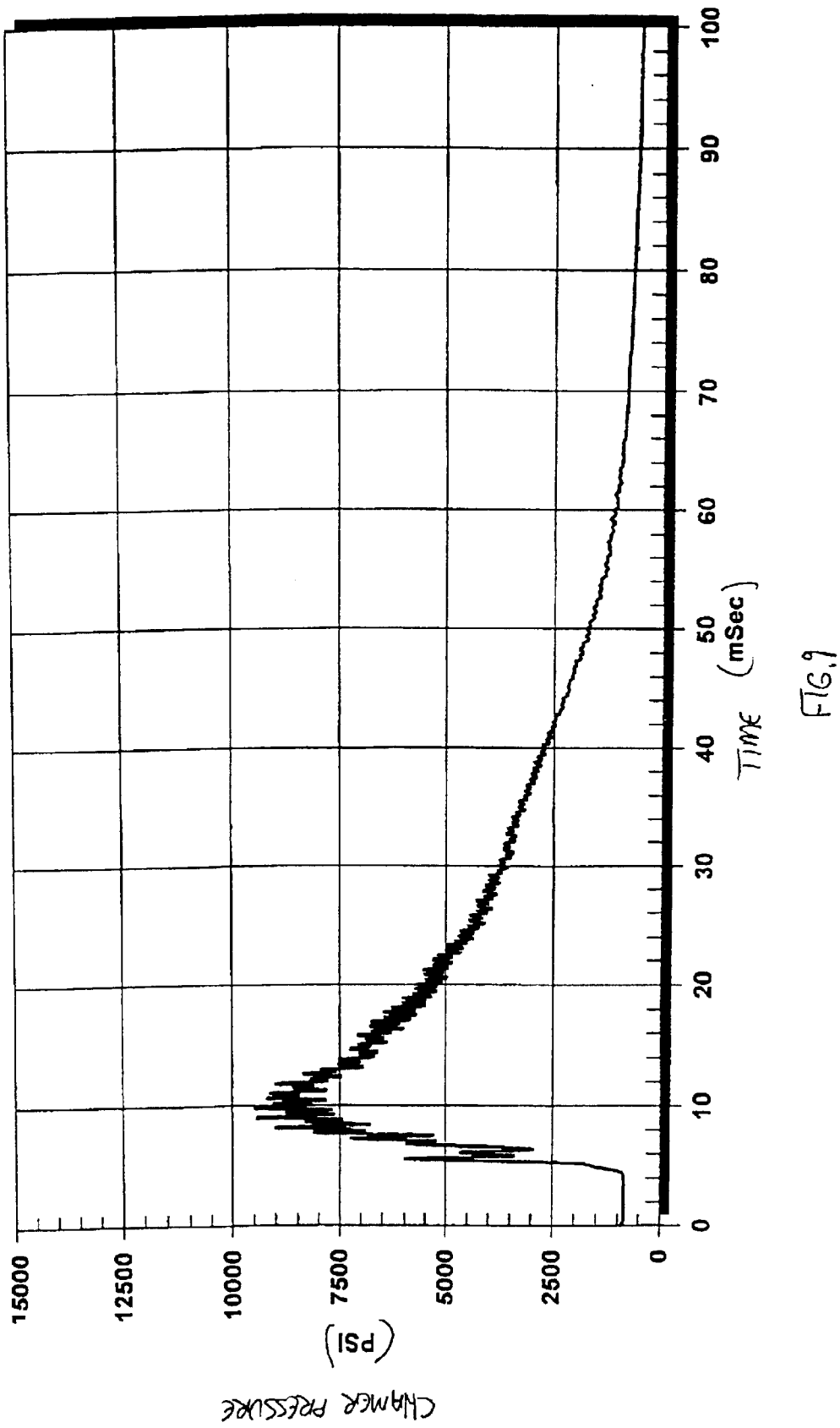

The measured pressure within the Example 1 test inflator pressure vessel is illustrated in FIG. 8. The peak internal pressure of 7020 psia (48.4 MPa) is typical of standard compressed gas inflator design. The measured pressure within the Example 2 test inflator pressure vessel is illustrated in FIG. 9. The peak internal pressure of 7501 psia (65.5 MPa) is typical of standard compressed gas inflator design. These pressure vessel results indicate that internal pressures are such that the pressure vessel wall thickness can be designed to be comparable with those presently in use. This is important because the wall thickness of the pressure vessel is a controlling factor in the overall weight of the inflator.

The results of Examples 1 and 2 demonstrate that both reactant mixtures—based on potassium tert-butoxide and potassium t-butyl carbonate work in a properly designed airbag inflator. The use of the carbonate may, however, be preferred based on such carbonates being generally relatively inexpensive and readily available. It is noted, however, that many members of the water-reactive fuel precursor family described above are inexpensive. The lower material costs associated with the use of such materials is generally one of the primary advantages associated with inflator devices in accordance with the invention.

In of the above, it will be appreciated that the invention provides an inflator device and inflation method which may desirably facilitate or otherwise more easily permit the advantageous use of compounds which react with water such as to form one or more hydrogen-containing materials such as hydrogen gas or a hydrocarbon while avoiding or minimizing one or more of the shortcomings or limitations relating to the prior use of water-reactive compounds in such inflation applications. The invention also provides an inflator device and inflation method which may desirably facilitate or otherwise more easily permit the advantageous use of compounds such as ammonium nitrate without incurring undesired complications such as described above relating to form and structure on the ammonium nitrate and the resulting performance characteristics thereof The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. In a method for inflating an inflatable safety device via an inflator device wherein a fuel material reacts to form gas generation reaction products, the improvement comprising:
heating a mixture containing at least a water-supplying compound and a water-reactive fuel precursor within the inflator device to form the fuel material in situ, wherein the fuel precursor comprises potassium t-butyl carbonate.

2. The method of claim 1 additionally comprising;
contacting the formed fuel material with a quantity of compressed gas, the compressed gas including a quantity of oxidant,
reacting at least a portion of the formed fuel material with at least a portion of the quantity of oxidant to produce heat,
heating a stored quantity of inert gas with at least a portion of the produced heat to form an increased volume of gas and
passing at least a portion of the increased volume of gas into the inflatable safety device to effect the inflation thereof.

3. The method of claim 1 wherein the water-supplying compound comprises ammonium nitrate.

4. The method of claim 1 wherein the water-supplying compound reacts to form water.

5. The method of claim 1 wherein the water-supplying compound and the water-reactive fuel precursor are included as contents contained in a first chamber and wherein said heating step comprises activating an initiator in discharge communication with the contents to form water.

6. The method of claim 5 wherein at least a portion of the formed water reacts with at least a portion of the water-reactive fuel precursor to form a fuel material.

7. The method of claim 5 wherein at least a portion of the water-supplying compound and at least a portion of the water-reactive fuel precursor are contained in the first chamber in direct contact.

8. The method of claim 5 wherein the first chamber is defined at least in part by a perforated housing.

9. The method of claim 8 wherein a liner within the perforated housing maintains the first chamber contents in discharge proximity with the initiator.

10. The method of claim 1 wherein, in an at rest condition, the water-supplying compound is stored segregated from the water-reactive fuel precursor within the first chamber.

11. A method for inflating an inflatable safety device via an inflator device wherein a fuel material reacts to form gas generation reaction products, the method comprising:
reacting a water-supplying compound contained within the inflator device to form water,
contacting a water-reactive fuel precursor contained within the inflator device with at least a portion of the formed water to form the fuel material in situ within the inflator device,
contacting the formed fuel material with a quantity of compressed gas, the compressed gas including a quantity of oxidant,
reacting at least a portion of the formed fuel material with at least a portion of the quantity of oxidant to produce heat,
heating a stored quantity of inert gas with at least a portion of the produced heat to form an increased volume of gas and
passing at least a portion of the increased volume of gas into the inflatable safety device to effect the inflation thereof,
wherein the water-reactive fuel precursor comprises potassium t-butyl carbonate.

12. The method of claim 11 wherein the water-supplying compound comprises ammonium nitrate.

13. The method of claim 11 wherein, in an at rest condition, the water-supplying compound and the water-reactive fuel precursor are stored within a first chamber, and wherein the water-supplying compound is stored segregated from the water-reactive fuel precursor.

14. A method for inflating an inflatable safety device via an inflator device wherein a fuel material reacts to form gas generation reaction products, the method comprising:

reacting a water-supplying compound contained within the inflator device to form water, the water-supplying compound selected from the group consisting of ammonium nitrate and an inorganic compound with stabilized waters of hydration, contacting a water-reactive fuel precursor contained within the inflator device with at least a portion of the formed water to form the fuel material in situ within the inflator device, wherein the water-reactive fuel precursor comprises potassium t-butyl carbonate, contacting the formed fuel material with a quantity of compressed gas, the compressed gas including a quantity of oxidant, reacting at least a portion of the formed fuel material with at least a portion of the quantity of oxidant to produce heat, heating a stored quantity of inert gas with at least a portion of the produced heat to form an increased volume of gas and passing at least a portion of the increased volume of gas into the inflatable safety device to effect the inflation thereof.

15. The method of claim 14 wherein the water-supplying compound comprises ammonium nitrate.

16. The method of claim 14 wherein, in an at rest condition, the water-supplying compound and the water-reactive fuel precursor are stored within a first chamber, and wherein the water-supplying compound is stored segregated from the water-reactive fuel precursor.

* * * * *